US008554239B2

(12) United States Patent
Zhang et al.

(10) Patent No.: US 8,554,239 B2
(45) Date of Patent: Oct. 8, 2013

(54) BASE BAND POOL DEVICE, AND METHOD FOR IMPLEMENTING BASE BAND DATA SWITCH THEREOF

(75) Inventors: Qing Zhang, Shenzhen (CN); Xu Yang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 13/259,607

(22) PCT Filed: Jun. 1, 2010

(86) PCT No.: PCT/CN2010/073435
§ 371 (c)(1),
(2), (4) Date: Apr. 10, 2012

(87) PCT Pub. No.: WO2010/145448
PCT Pub. Date: Dec. 23, 2010

(65) Prior Publication Data
US 2012/0202507 A1    Aug. 9, 2012

(30) Foreign Application Priority Data

Oct. 20, 2009    (CN) .......................... 2009 1 0179698

(51) Int. Cl.
*H04W 72/00* (2009.01)
*H04B 1/38* (2006.01)
*H04W 4/00* (2009.01)

(52) U.S. Cl.
USPC ............................ 455/450; 455/561; 370/331

(58) Field of Classification Search
USPC .................... 455/450, 561; 370/331
See application file for complete search history.

(56) References Cited

U.S. PATENT DOCUMENTS

| 6,308,286 | B1 * | 10/2001 | Richmond et al. ............. 714/13 |
| 6,606,496 | B1 * | 8/2003 | Salvarani et al. ............. 455/436 |
| 7,948,948 | B2 * | 5/2011 | Xu et al. ...................... 370/331 |
| 2005/0245267 | A1 * | 11/2005 | Guethaus ...................... 455/450 |
| 2007/0230328 | A1 * | 10/2007 | Saitou ........................... 370/210 |
| 2008/0045157 | A1 * | 2/2008 | Takahashi .................. 455/67.11 |
| 2009/0149221 | A1 * | 6/2009 | Liu et al. ...................... 455/561 |

FOREIGN PATENT DOCUMENTS

| CN | 101035325 A | 9/2007 |
| CN | 101232654 A | 7/2008 |
| CN | 101505500 A | 8/2009 |
| WO | 2006026891 A1 | 3/2006 |
| WO | 2006066449 A1 | 6/2006 |

OTHER PUBLICATIONS

PTC International Search Report Dated Sep. 9, 2010, Applicant ZTE Corporation et al., Application No. PCT/CN2010/073435.

\* cited by examiner

*Primary Examiner* — Meless N Zewdu
*Assistant Examiner* — Jean Chang
(74) *Attorney, Agent, or Firm* — Brooks Kushman, P.C.

(57) ABSTRACT

A baseband pool device includes a control unit, and a plurality of baseband processing units which are connected one another. The control unit is configured to determine one or more baseband processing units participating in data processing according to a size of data received by the baseband pool device and baseband data processing capabilities of various baseband processing unit, and allocate an identifier of the baseband data to be processed to each baseband processing unit participating in the data processing to construct a data allocation relationship, and respectively transmit the data allocation relationship to the baseband processing units participating in the data processing. The baseband processing units receive the data allocation relationship; and, process the received data according to the data allocation relationship, or transmit the received data to other baseband processing units of the baseband pool device, or receive data processed and then forwarded by other baseband processing units. A method for implementing baseband data distributed switch is also provided. The present invention increases the baseband processing capacity and reduces the cost.

16 Claims, 6 Drawing Sheets

FIG. 1

Prior Art

BASE BAND POOL DEVICE, AND METHOD FOR IMPLEMENTING BASE BAND DATA SWITCH THEREOF

CROSS-REFERENCE TO RELATED APPLICATION

This application is the U.S. national phase of PCT Appln. No. PCT/CN2010/073435 filed Jun. 1, 2010 which claims priority to Chinese application 200910179698.7 filed Oct. 20, 2009, the disclosures of which are incorporated in their entirety by reference herein.

TECHNICAL FIELD

The present invention relates to a wireless communication system, and in particular, to a baseband pool device and a method for implementing baseband data switch thereof.

BACKGROUND OF THE RELATED ART

In recent years, the development of the wireless communication system architecture gradually evolves into a trend of a distributed base station system. The distributed base station system is to separate a Base Band Unit (BBU) from a Remote Radio Unit (RRU) of a base station, i.e., separating a baseband processing module from a radio frequency module, and to connect the BBU with the RRU through the transmission media such as optical fibers etc.

A separation mode of the RRU and the BBU which is relatively widely applied at present is based on a baseband transmission mode. With this mode, the baseband data is transmitted on a physical interface between the RRU and the BBU, and digital intermediate frequency processing, Analog/Digital converting (A/D converting) or Digital/Analog converting (D/A converting) and analog radio frequency processing are performed in the RRU.

If baseband resources on the BBU can be shared by the RRU, sharing and flexible configuration of the baseband resources can be implemented, i.e., implementing a baseband pool function. At present, a common method for implementing the baseband pool function is to provide a baseband data switch function module. The baseband resources on the BBU can implement random switch of the baseband data through the baseband data switch function module, so as to transmit the data to any RRU, thus implementing dynamical allocation of the baseband resources. The scheme is similar to a scheme of the centralized baseband data switch.

SUMMARY OF THE INVENTION

Figure 1:
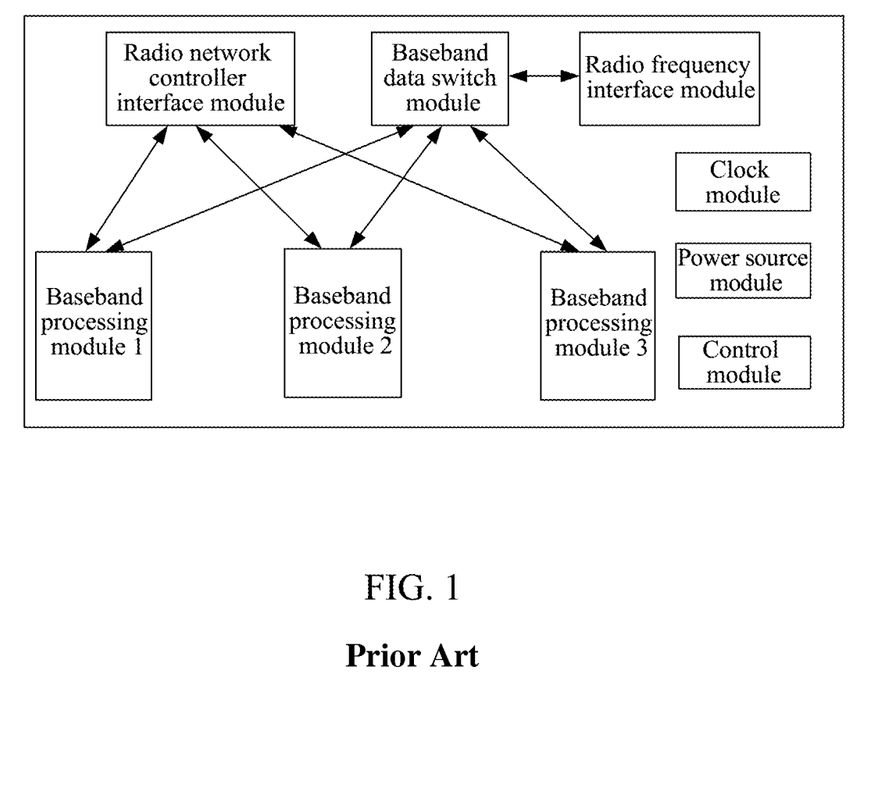
FIG. 1 is a structural diagram of a baseband pool device in the related art.

In the scheme of the centralized baseband data switch, as shown in FIG. 1, the maximum capacity of the BBU depends on a size of a switch matrix of a baseband data switch module, and therefore, even in a use scenario with a small capacity, a relatively large switch matrix should be used. Thus, this scheme of intensively implementing the baseband data switch has the following disadvantages. First, expanding the capacity is inconvenient, and if the maximum switch capacity has been achieved, the capacity of a single BBU cannot be further increased; second, the reliability is relatively low, and because it is the centralized processing baseband switch, whether the baseband data switch module is normal directly relates to whether the BBU can operate normally; and third, the cost is relatively high, and in a plurality of applications where less baseband resources are needed, a relatively large switch function module also requires configuring, and thus the cost is relatively high.

The technical problem to be solved by the present invention is to provide a baseband pool device and a method for implementing baseband data switch, thus implementing the baseband data distributed switch, and increasing the capacity and reliability of the BBU system at the meanwhile when reducing the cost.

In order to solve the above technical problem, the present invention discloses a baseband pool device, comprising a control unit and a plurality of baseband processing units, and the baseband processing units are connected one another, wherein, the control unit is configured to: determine one or more baseband processing units participating in data processing according to a size of data received by the baseband pool device and baseband data processing capabilities of various baseband processing units, and allocate an identifier of the baseband data to be processed to each baseband processing unit participating in the data processing to construct a data allocation relationship, and respectively transmit the data allocation relationship to the baseband processing units participating in data processing; and the baseband processing units are configured to: receive the data allocation relationship; and, process the received data according to the data allocation relationship, or transmit the received data to other baseband processing units of the baseband pool device, or receive data processed and then forwarded by other baseband processing units.

The baseband processing unit comprises a dedicated baseband data switch module and a baseband data processing module, and various baseband processing units are connected one another through the dedicated baseband data switch module, wherein, the dedicated baseband data switch module is configured to: receive data according to the data allocation relationship and transmit the received data to the baseband data processing module, or transmit the received data to dedicated baseband data switch modules of other baseband processing units, or receive data forwarded by the dedicated baseband data switch modules of other baseband processing units;

the baseband data processing module is configured to: perform baseband processing on the data transmitted by the dedicated baseband data switch module, and return the processed data to the dedicated baseband data switch module.

The baseband processing unit further comprises a radio frequency interface module which is connected with the dedicated baseband data switch module, wherein, the dedicated baseband data switch module is further configured to: transmit data after the baseband processing to the radio frequency interface module, or receive data transmitted by the radio frequency interface module;

the radio frequency interface module is configured to: transmit the data transmitted by the dedicated baseband data switch module to a corresponding radio frequency module, or receive data transmitted by the radio frequency module and transmit the data to the dedicated baseband data switch module.

The baseband pool device is separated from the radio frequency module.

The baseband pool device further comprises a network interface module, which is connected with both the control unit and the baseband processing units; wherein, the control unit is further configured to: transmit the data allocation relationship to the network interface module;

the baseband processing unit is further configured to: perform baseband processing on data transmitted by the network interface module, or return the processed data to the network interface module;

the network interface module is configured to: receive the data transmitted to the baseband pool device and receive the data allocation relationship, and transmit the received data to the baseband processing units participating in the data processing according to the data allocation relationship, or receive data transmitted by the baseband processing units and transmit the data to a radio network controller.

The present invention further discloses a method for implementing baseband data switch, comprising:

a baseband pool device determining one or more baseband processing units participating in data processing according to a size of received data and a baseband data processing capability of various baseband processing units, and allocating an identifier of the baseband data to be processed to each baseband processing unit to construct a data allocation relationship, and respectively transmitting the data allocation relationship to the baseband processing units participating in data processing;

the baseband processing units participating in the data processing receiving the data allocation relationship; and the baseband processing units participating in the data processing processing the received data according to the data allocation relationship; or the baseband processing units participating in the data processing transmitting the received data to other baseband processing units of the baseband pool device, or receiving data processed and then forwarded by other baseband processing units, so as to implement baseband data distributed switch.

The step of processing the received data according to the data allocation relationship comprises: receiving data according to the data allocation relationship and processing the received data by the baseband data processing module;

the step of transmitting the received data to other baseband processing units of the baseband pool device comprises: the baseband processing unit transmitting the received data to dedicated baseband data switch modules of other baseband processing units for processing;

the step of receiving data processed and then forwarded by other baseband processing units comprises: the baseband processing unit receiving the data forwarded by dedicated baseband data switch modules of other baseband processing units through the dedicated baseband data switch modules.

After the step of processing the received data according to the data allocation relationship or after the step of receiving data processed and then forwarded by other baseband processing units, the method further comprises:

the baseband processing unit further transmitting the data after baseband processing to a corresponding radio frequency module through a radio frequency interface module, or the baseband processing unit transmitting the processed data to a network interface module.

The baseband pool device is separated from the radio frequency module.

After the step of the baseband processing units participating in the data processing receiving the data allocation relationship, the method further comprises:

the baseband pool device distributing the received data to the baseband processing units participating in the data processing through a network interface module.

The technical scheme of the present invention provides a distributed baseband data switch function, which changes the centralized baseband data switch into distributed baseband data switch and can perform distributed processing on the baseband data switch, thus facilitating to enhance the reliability, to increase the baseband processing capacity and to reduce the cost.

BRIEF DESCRIPTION OF DRAWINGS

FIG. 4 (a) is a flowchart of a baseband pool device transmitting uplink data according to the present embodiment.

PREFERRED EMBODIMENTS OF THE PRESENT INVENTION

The main concept of the present invention is based on a structure of the baseband pool in the related art illustrated in FIG. 1, which can change the centralized baseband data switch into that each baseband processing unit itself has a baseband data switch module with a small capacity, thus implementing distributed switch of the baseband data.

The technical scheme according to the present invention will be further described in combination with accompanying drawings and specific embodiments hereinafter.

Figure 2:
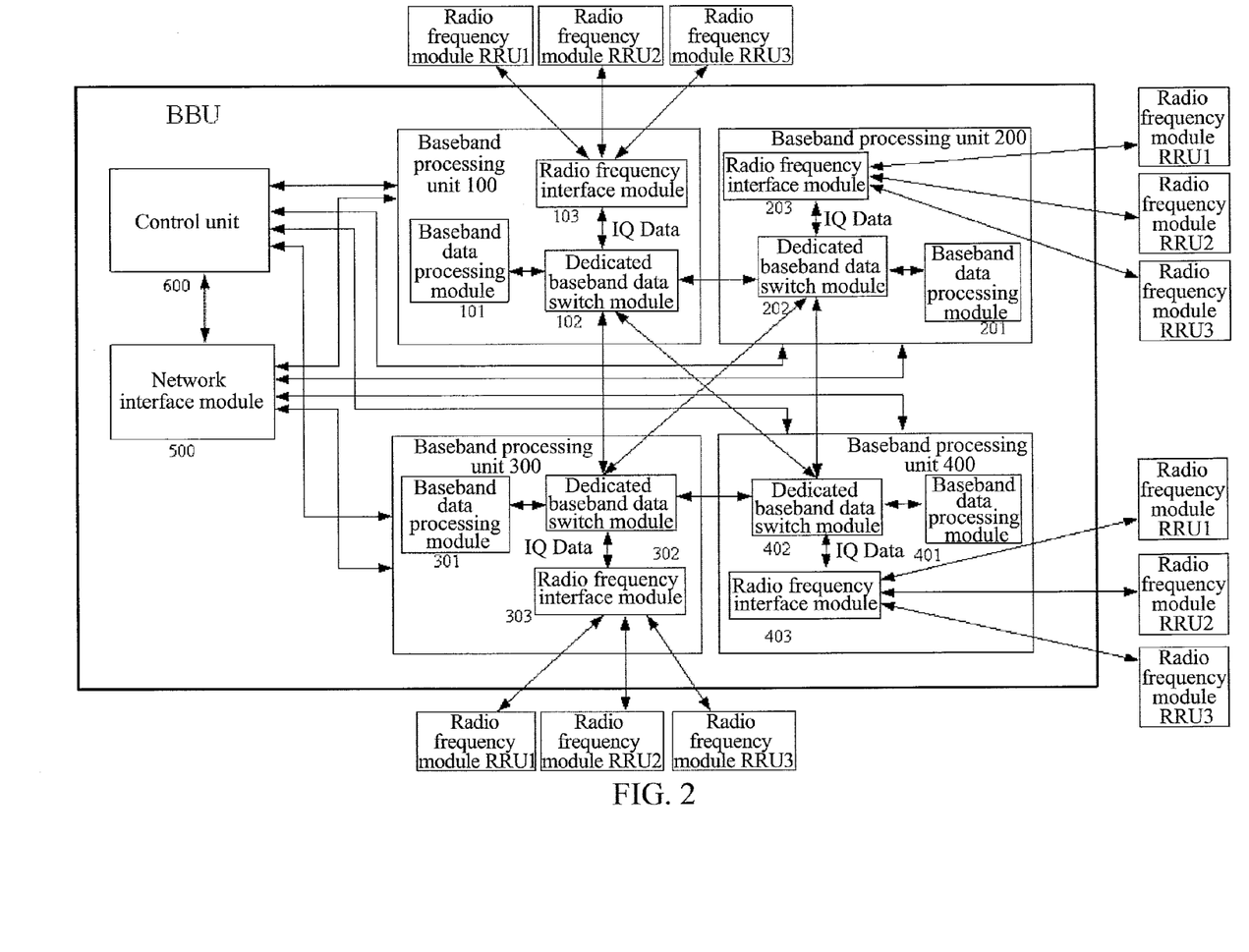
FIG. 2 is a structural diagram of a baseband pool device according to the present embodiment.

A baseband pool device can implement baseband data distributed switch. The structure of the baseband pool device is shown in FIG. 2, which comprises a plurality of baseband processing units (comprising four baseband processing units 100, 200, 300 and 400 in the present embodiment), a network interface module 500, a radio frequency module, a control unit 600 and other modules (such as clocks and power etc.). The functions of each portion will be described hereinafter.

The baseband processing units 100, 200, 300 and 400 are primarily configured to perform baseband processing on received uplink or downlink data, and transmit the processed data to the network interface module 500 or the radio frequency interface module.

Specifically, the baseband processing unit at least comprises one baseband data processing module and a dedicated baseband data switch module of the baseband data processing module, wherein the dedicated baseband data switch modules of various baseband processing units form the mesh interconnection, and they can be interconnected by a backplane, or can be interconnected by other transmission modes such as cables etc. In the present embodiment, each baseband processing unit further comprises a radio frequency interface module, and the baseband processing unit can be connected with any Remote Radio Unit (RRU) through the radio frequency interface module of the baseband processing unit and the dedicated baseband data switch modules which are in mesh interconnection;

wherein the dedicated baseband data switch modules are configured to store data allocation relationship transmitted by the control unit, and process the received baseband data according to the data allocation relationship; or forward a part of or all of the received baseband data to other dedicated baseband data switch modules, and receive the baseband data returned by other dedicated baseband data switch modules, and transmit the baseband data to the initial radio frequency module.

The network interface module 500 primarily accesses the data of the radio network controller into various baseband processing units 100, 200, 300 and 400 in accordance with the prior art.

The control unit 600 is a module for controlling, managing and configuring the BBU. For the baseband data distributed switch function, the control unit 600 primarily determines to transmit the received data to one or more baseband processing units for processing (i.e., determining the baseband processing units participating in the data processing) according to the size of the data received by the baseband pool device and the processing capability of the baseband data processing module of each baseband processing unit, and configures the data allocation relationship among the baseband processing unit participating in the data processing to each baseband processing units 100, 200, 300 and 400 as well as the network interface module 500.

Specifically, whether the processing capacities of data baseband processing modules 101, 201, 301 and 401 of various baseband processing units 100, 200, 300 and 400 satisfy the requirements or fails can be determined in turn. When the capability of the baseband data processing module of the baseband processing unit which is currently judged (such as the default baseband processing unit) is insufficient, a part of the received data is allocated to the baseband processing unit in accordance with the capacity of the baseband data processing module, and the remaining data is allocated to other one or more baseband processing units, and the data allocation relationship is configured to these baseband processing units 100, 200, 300 and 400 as well as the network interface module 500.

For example, the processing capability of each baseband processing unit is M baseband data, and the radio frequency module connected with the baseband processing unit 100 has N baseband data in all, wherein when N>M, the control unit 600 is responsible for allocating the N baseband data to the baseband processing unit 100, the baseband processing unit 200, and the baseband processing unit 300 for processing, and at this time, if the baseband data allocated to the baseband processing unit 100 is M1, the baseband data allocated to the baseband processing unit 200 is M2, and the baseband data allocated to the baseband processing unit 300 is M3, they are required to satisfy the following condition:

M1+M2+M3=N; wherein M1<M; M2<M; and M3<M.

The control unit 600 sets the data allocation relationship according to the above condition, that is, baseband data identifiers to be processed by each baseband processing unit, and the control unit 600 respectively configures the data allocation relationship to the baseband processing unit 100, the baseband processing unit 200, the baseband processing unit 300 and the network interface module 500.

Specifically, for the downlink data link, the downlink data is received through the network interface module 500, and when the processing capability of a certain baseband data processing module is insufficient or the function of the baseband data processing module fails, one or more baseband data processing units participating in the data processing are determined and the data of various baseband data processing modules are allocated to one or more baseband data processing modules participating in the data processing to construct a data allocation relationship, the control unit 600 transmits the constructed data allocation relationship to the network interface module 500 and baseband processing units participating in the data processing, i.e., the control network interface module 500 transmits a part of or all of the data to the baseband data processing units participating in the data processing for processing, and the baseband data after being processing by the baseband data processing modules participating in the data processing are switched into the corresponding baseband processing unit by the dedicated baseband data switch module thereof according to the data allocation relationship and is transmitted to corresponding radio frequency module.

For the uplink data link, the uplink baseband data are received by the radio frequency interface module, and the radio frequency interface module transmits the baseband data to corresponding dedicated baseband data switch module (such as the dedicated baseband data switch module in the default baseband processing unit), and its corresponding baseband data processing module can process the baseband data, or can switch a part of or all of the data into any baseband data processing module for baseband processing through the dedicated baseband data switch module, and the data after completing the baseband processing are transmitted to the radio network controller through the network interface module.

In the present embodiment, the dedicated baseband data switch module is connected with the radio frequency module via the radio frequency interface module, wherein each dedicated baseband data switch module can be allocated to one radio frequency interface module respectively (i.e., allocating one radio frequency interface module in each baseband processing unit). While in other embodiments, only one radio frequency interface module can be allocated to all of the dedicated baseband data switch modules (for example, the radio frequency interface module can be used as an independent module and is set outside the baseband processing unit).

The procedure of the above device transmitting data will be described hereinafter.

Figure 3A:
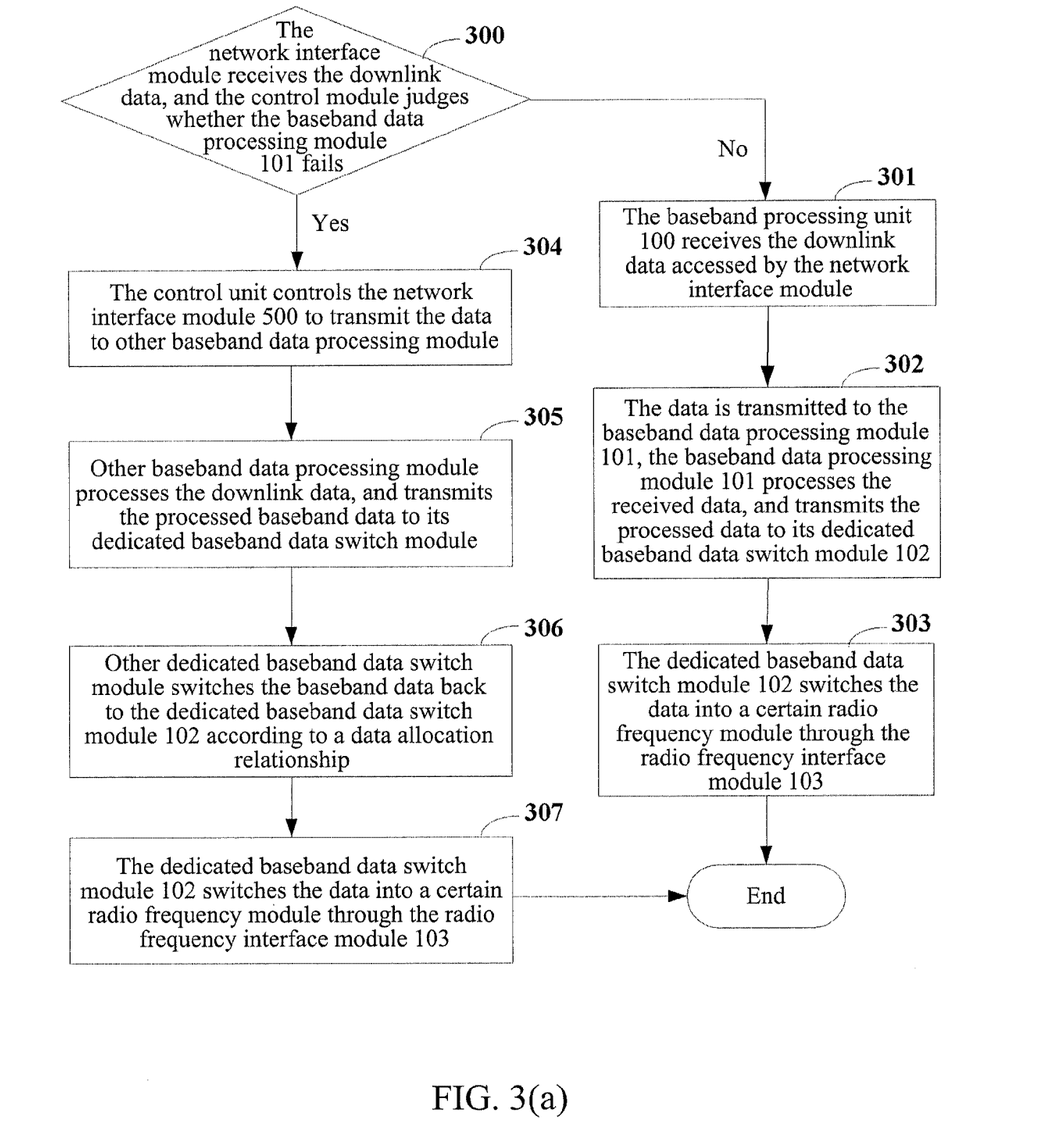
FIG. 3(a) is a flowchart of a baseband pool device receiving downlink data according to the present embodiment.

The present embodiment illustrates the working procedure of the above device by an example of receiving downlink data. The procedure is shown in FIG. 3(a), and comprises the following steps.

In Step 300, the network interface module 500 receives the downlink data, and the control unit 600 determines whether the function of the baseband data processing module 101 in the baseband processing unit 100 fails, and if it fails, Step 304 is performed, and if it does not fail, Step 301 is performed.

In the present embodiment, as the baseband pool device regards the baseband processing unit 100 as a default baseband processing unit, the control unit 600 first determines whether the function of the baseband data processing module 101 in the baseband processing unit 100 fails, and when the baseband pool device regards the other baseband processing unit (for example the baseband processing unit 200) as the default baseband processing unit, the control unit first determines whether the function of the baseband data processing module 201 in the baseband processing unit 200 fails.

The baseband data processing module failing refers that the baseband data module works abnormally.

In Step 301, the baseband processing unit 100 receives the downlink data accessed from the network interface module.

In the step, the network interface module accesses the data of the radio network controller into the baseband processing unit 100.

In Step 302, the data is transmitted to the baseband data processing module 101, and the baseband data processing module 101 processes the received data and transmits the processed data to the dedicated baseband data switch module 102 thereof.

In Step 303, the dedicated baseband data switch module 102 switches the data into a certain radio frequency module through the radio frequency interface module 103 and the present procedure ends.

In the step, the certain radio frequency module, into which the dedicated baseband data switch module 102 switches the data through the radio frequency interface module 103, can be a certain radio frequency module allocated to the present baseband processing unit (such as radio frequency module RRU1). As the dedicated baseband data switch modules are in the mesh interconnection one another, in other embodiments, the dedicated baseband data switch module 102 can also switch the data into a certain radio frequency module allocated to other baseband processing unit (such as the radio frequency module RRU3 of the baseband processing unit 300).

In Step 304, the control unit controls the network interface module 500 to transmit the data to the other baseband data processing module (such as baseband data processing modules 201, 301 or 401).

Specifically, in the step, the control unit determines the processing of which baseband processing units is required according to the baseband data amount of the accessed downlink data and the processing capability of the baseband data processing module in other each baseband processing unit after determining that the function of the baseband data processing module 101 in the baseband processing unit 100 fails, and sets a data allocation relationship for these baseband processing units, and configures the data allocation relationship to these baseband processing units and the network interface module respectively, i.e., controlling the network interface module 500 to transmit the data to the other baseband data processing module (such as baseband data processing module 201, 301 or 401).

In step 305, the other baseband data processing module (such as baseband data processing module 201, 301 or 401) processes the downlink data, and transmits the processed baseband data to the dedicated baseband data switch module (such as dedicated baseband data switch module 202, 302 or 402) corresponding to the baseband data processing module.

In Step 306, the other dedicated baseband data switch module (such as dedicated baseband data processing module 202, 302 or 402) switches the baseband data back to the dedicated baseband data switch module 102 according to the data allocation relationship.

In the present embodiment, as each dedicated baseband data switch module is allocated with one radio frequency interface module respectively, in Step 306, the baseband data is switched back to the dedicated baseband data switch module. In other embodiments, for example, the radio frequency interface module is used as an independent module set outside the baseband processing unit, and at this point, the data is directly switched to the corresponding radio frequency module through the radio frequency interface module by the dedicated baseband data processing module 202, 302 or 402 instead of switching the data back to the dedicated baseband data switch module.

In Step 307, the dedicated baseband data switch module 102 switches the data to a certain radio frequency module through the radio frequency interface module 103, and the present procedure ends.

Figure 3B:
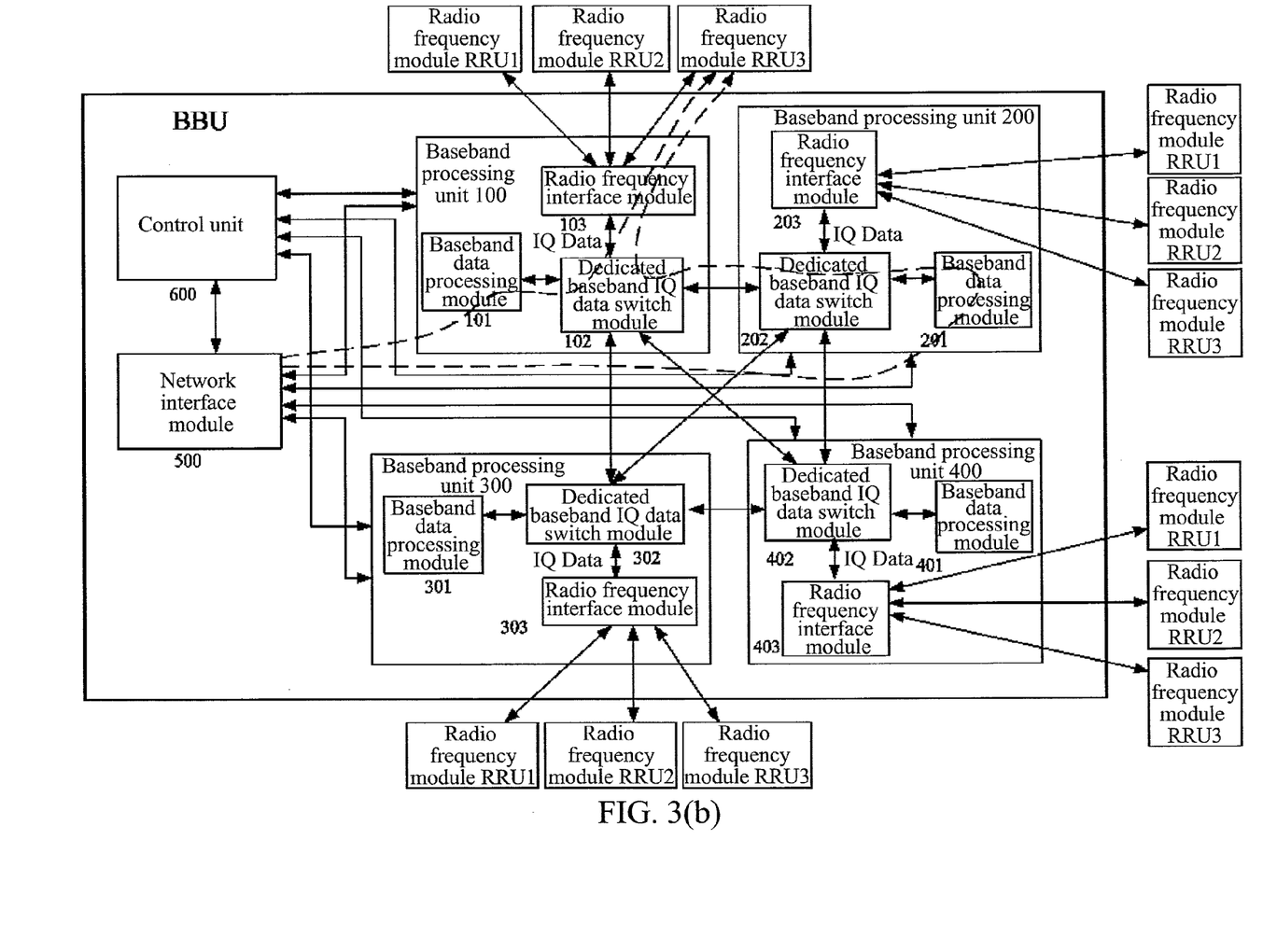
FIG. 3(b) is a schematic diagram of a flow direction of data switch in a procedure illustrated in FIG. 3(a)

In accordance with the above procedure, the network interface module transmits the data to the baseband data processing module 201, and when the data is processed by the baseband data processing module 201, the flow direction of the data is shown as the dotted line in FIG. 3(*b*).

Figure 4A:
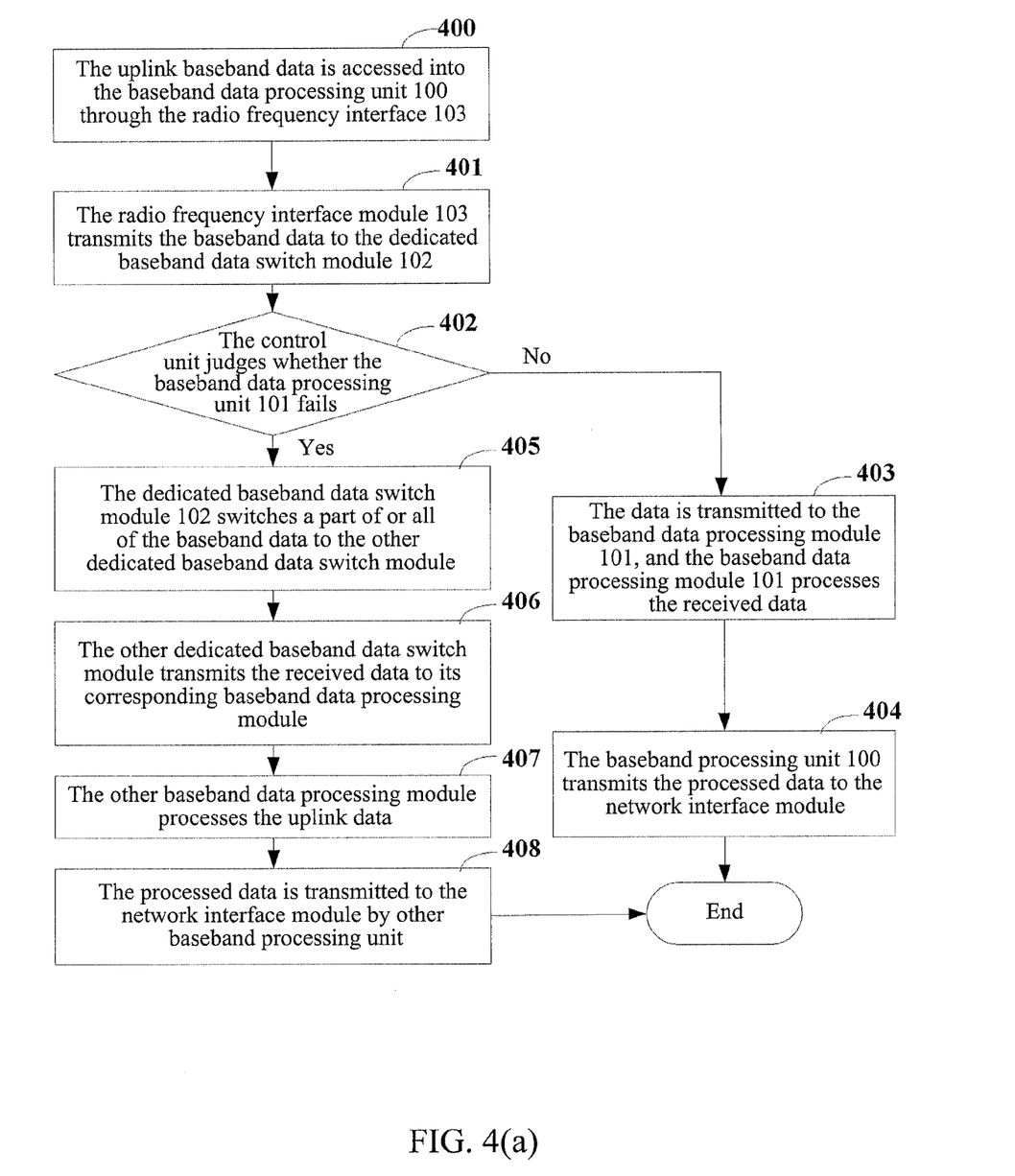

The present embodiment illustrates the working procedure of the above device further by an example of uplink data. The procedure is shown in FIG. 4(*a*), and comprises the following steps.

In Step 400, the uplink baseband data is accessed to the baseband data processing unit 100 through the radio frequency interface module 103.

In Step 401, the radio frequency interface module 103 transmits the baseband data to the dedicated baseband data switch module 102.

In Step 402, the control unit judges whether the baseband data processing module 101 fails, and if it fails, Step 405 is performed, if it does not fail, Step 403 is performed.

In the step, the baseband data processing module 101 failing refers that the function of the baseband data processing module 101 is insufficient.

In Step 403, the dedicated baseband data switch module 102 transmits the data to the baseband data processing module 101, and the baseband data processing module 101 processes the received data.

In Step 404, the baseband processing unit 100 transmits the processed data to the network interface module 500 and the present procedure ends.

In Step 405, the control unit controls the dedicated baseband data switch module 102 to switch a part of or all of the baseband data to the other dedicated baseband data switch module (such as dedicated baseband data switch module 202, 302, or 402).

Specifically, in the step, the control unit determines the processing of which baseband processing units is required according to the baseband data amount of the accessed uplink data and the processing capacity of the baseband data processing module in other various baseband processing units after determining that the function of the baseband data processing module 101 in the baseband processing unit 100 fails, and sets a data allocation relationship for these baseband processing units, and configures the data allocation relationship into these baseband processing units respectively, and these baseband processing units process the received data.

In Step 406, the other dedicated baseband data switch module transmits the received data to corresponding baseband data processing module thereof (such as baseband data processing module 201, 301 or 401).

In Step 407, the other baseband data processing module (such as baseband data processing module 201, 301 or 401) processes the uplink data.

In Step 408, the processed data is transmitted to the network interface module 500 by the other baseband processing unit, and the present procedure ends.

Figure 4B:
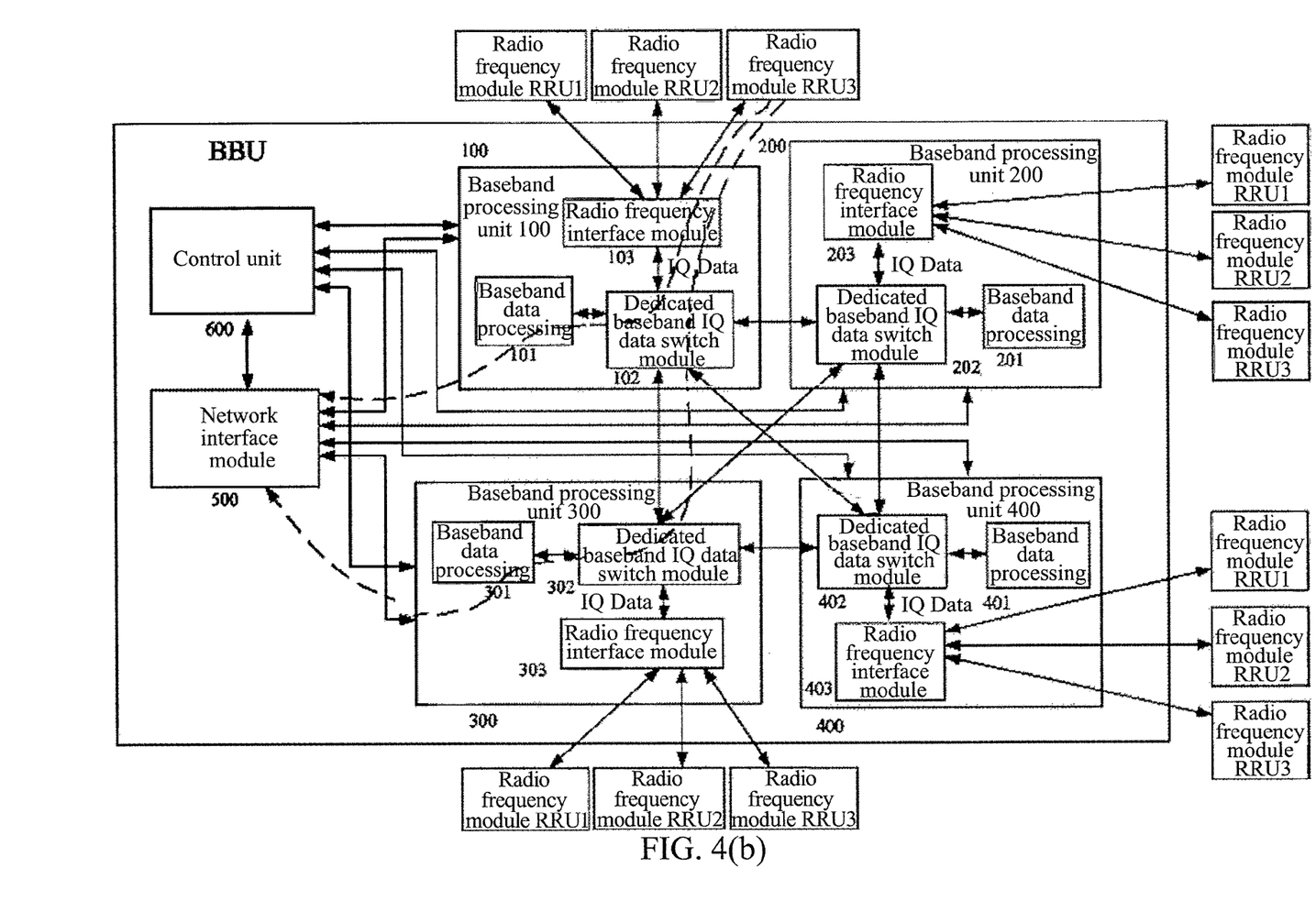
FIG. 4(b) is a schematic diagram of a flow direction of data switch in a procedure illustrated in FIG. 4(a).

In accordance with the above procedure, when the dedicated baseband data switch module 102 forwards the uplink data to the dedicated baseband data switch module 302 and then the uplink data is processed by the baseband data processing module 301, the flow direction of the data is shown as the dotted line in FIG. 4(*b*).

The above description is only the preferred embodiments of the present invention and is not intended to limit the present invention. Various modifications and variations may be made to the present invention by those skilled in the art. Any modification, equivalent substitutions and improvements made within the spirit and principle of the present invention should be fall into the protection scope of the present invention.

Industrial Applicability

The technical scheme of the present invention provides a distributed baseband data switch function, which changes the centralized baseband data switch into distributed baseband data switch and can perform distributed processing on the baseband data switch, thus facilitating to enhance the reliability, to increase the baseband processing capacity and to reduce the cost.

What is claimed is:

1. A baseband pool device, comprising a control unit, and a plurality of baseband processing units which are connected one another, wherein, the control unit is configured to: determine one or more baseband processing units participating in data processing according to a size of data received by the baseband pool device and baseband data processing capability of each baseband processing unit, and allocate an identifier of baseband data to be processed to each baseband processing unit participating in data processing to construct a data allocation relationship, and respectively transmit the data allocation relationship to the each baseband processing unit participating in data processing; and the baseband processing unit is configured to: receive the data allocation relationship; and, process received data according to the data allocation relationship, or transmit the received data to another baseband processing unit in the baseband pool device, or receive data processed and then forwarded by another baseband processing unit.

2. The device according to claim 1, wherein the baseband processing unit comprises a dedicated baseband data switch module and a baseband data processing module, and all the baseband processing units are connected one another through the dedicated baseband data switch module, wherein, the dedicated baseband data switch module is configured to: receive data according to the data allocation relationship and transmit the received data to the baseband data processing module, or transmit the received data to the dedicated baseband data switch module of another baseband processing unit, or receive data forwarded by the dedicated baseband data switch modules of another baseband processing unit;

the baseband data processing module is configured to: perform baseband processing on the data transmitted by the dedicated baseband data switch module, and return processed data to the dedicated baseband data switch module.

3. The device according to claim 2, wherein the baseband processing unit further comprises a radio frequency interface module which is connected with the dedicated baseband data switch module, wherein, the dedicated baseband data switch module is further configured to: transmit data after the baseband processing to the radio frequency interface module, or receive data transmitted by the radio frequency interface module;

the radio frequency interface module is configured to: transmit the data transmitted by the dedicated baseband data switch module to a corresponding radio frequency module, or receive data transmitted by the radio frequency module and transmit the data to the dedicated baseband data switch module.

4. The device according to claim 3, wherein the baseband pool device is separated from the radio frequency module.

5. The device according to claim 4, wherein the baseband pool device further comprises a network interface module, which is connected with both the control unit and all the baseband processing units; wherein, the control unit is further configured to: transmit the data allocation relationship to the network interface module;

the baseband processing unit is further configured to: perform baseband processing on data transmitted by the network interface module, or return processed data to the network interface module;

the network interface module is configured to: receive data transmitted to the baseband pool device and receive the data allocation relationship, and transmit the received data to the each baseband processing unit participating in data processing according to the data allocation relationship, or receive data transmitted by the baseband processing units and transmit the data to a radio network controller.

6. The device according to claim 2, wherein the baseband pool device further comprises a network interface module, which is connected with both the control unit and all the baseband processing units; wherein, the control unit is further configured to: transmit the data allocation relationship to the network interface module;

the baseband processing unit is further configured to: perform baseband processing on data transmitted by the network interface module, or return processed data to the network interface module;

the network interface module is configured to: receive data transmitted to the baseband pool device and receive the data allocation relationship, and transmit the received data to the each baseband processing unit participating in data processing according to the data allocation relationship, or receive data transmitted by the baseband processing units and transmit the data to a radio network controller.

7. The device according to claim 3, wherein the baseband pool device further comprises a network interface module, which is connected with both the control unit and all the baseband processing units; wherein, the control unit is further configured to: transmit the data allocation relationship to the network interface module;

the baseband processing unit is further configured to: perform baseband processing on data transmitted by the network interface module, or return processed data to the network interface module;

the network interface module is configured to: receive data transmitted to the baseband pool device and receive the data allocation relationship, and transmit the received data to the each baseband processing unit participating in data processing according to the data allocation relationship, or receive data transmitted by the baseband processing units and transmit the data to a radio network controller.

8. The device according to claim 1, wherein the baseband pool device further comprises a network interface module, which is connected with both the control unit and all the baseband processing units; wherein, the control unit is further configured to: transmit the data allocation relationship to the network interface module;

the baseband processing unit is further configured to: perform baseband processing on data transmitted by the network interface module, or return processed data to the network interface module;

the network interface module is configured to: receive data transmitted to the baseband pool device and receive the data allocation relationship, and transmit the received data to the each baseband processing unit participating in data processing according to the data allocation relationship, or receive data transmitted by the baseband processing units and transmit the data to a radio network controller.

9. A method for implementing baseband data switch, comprising:

a baseband pool device determining one or more baseband processing units participating in data processing according to a size of received data and baseband data processing capability of each baseband processing unit, and allocating an identifier of baseband data to be processed to each baseband processing unit participating in data processing to construct a data allocation relationship, and respectively transmitting the data allocation relationship to the each baseband processing unit participating in data processing;

the baseband processing unit participating in data processing receiving the data allocation relationship; and the baseband processing unit participating in data processing processing received data according to the data allocation relationship; or the baseband processing unit participating in data processing transmitting the received data to another baseband processing unit in the baseband pool device, or receiving data processed and then forwarded by another baseband processing unit, so as to implement baseband data distributed switch.

10. The method according to claim 9, wherein, the step of processing received data according to the data allocation relationship comprises: receiving data according to the data allocation relationship and processing the received data by the baseband data processing module;

the step of transmitting the received data to another baseband processing unit in the baseband pool device comprises: the baseband processing unit transmitting the received data to a dedicated baseband data switch module of another baseband processing unit for processing;

the step of receiving data processed and then forwarded by another baseband processing unit comprises: the baseband processing unit receiving, through the dedicated baseband data switch module, the data forwarded by the dedicated baseband data switch module of another baseband processing unit.

11. The method according to claim 10, after the step of processing received data according to the data allocation relationship or after the step of receiving data processed and then forwarded by another baseband processing unit, the method further comprising:

the baseband processing unit further transmitting the data after baseband processing to a corresponding radio frequency module through a radio frequency interface module, or the baseband processing unit transmitting the processed data to a network interface module.

12. The method according to claim 11, wherein, the baseband pool device is separated from the radio frequency module.

13. The method according to claim 12, after the step of the baseband processing unit participating in data processing receiving the data allocation relationship, further comprising:

the baseband pool device distributing received data to the each baseband processing unit participating in data processing through the network interface module.

14. The method according to claim 10, after the step of the baseband processing unit participating in data processing receiving the data allocation relationship, the method further comprising:

the baseband pool device distributing received data to the each baseband processing unit participating in data processing through a network interface module.

15. The method according to claim 11, after the step of the baseband processing unit participating in data processing receiving the data allocation relationship, the method further comprising:

the baseband pool device distributing received data to the each baseband processing unit participating in data processing through the network interface module.

16. The method according to claim 9, after the step of the baseband processing unit participating in data processing receiving the data allocation relationship, the method further comprising:

the baseband pool device distributing received data to the each baseband processing unit participating in data processing through a network interface module.

* * * * *